United States Patent
Stevens

(10) Patent No.: US 7,383,833 B2
(45) Date of Patent: Jun. 10, 2008

(54) VALVE FOR AIR TANK

(75) Inventor: Simon Benjamin Stevens, Sewell, NJ (US)

(73) Assignee: National Paintball Supply, Inc., Sewell, NJ (US)

( * ) Notice: Subject to any disclaimer, the term of this patent is extended or adjusted under 35 U.S.C. 154(b) by 0 days.

(21) Appl. No.: 11/600,285

(22) Filed: Nov. 15, 2006

(65) Prior Publication Data

US 2007/0125352 A1     Jun. 7, 2007

Related U.S. Application Data

(63) Continuation of application No. 11/485,067, filed on Jul. 12, 2006, now Pat. No. 7,231,912, and a continuation of application No. 11/001,716, filed on Dec. 2, 2004, now Pat. No. 7,163,008.

(60) Provisional application No. 60/604,762, filed on Aug. 26, 2004.

(51) Int. Cl.
   *F41B 11/00*     (2006.01)

(52) U.S. Cl. .................. 124/73; 124/74; 137/538; 137/312

(58) Field of Classification Search ............... 124/73, 124/74; 137/312, 538
   See application file for complete search history.

(56) References Cited

U.S. PATENT DOCUMENTS

| | | | |
|---|---|---|---|
| 4,150,656 A | 4/1979 | Curran | |
| 5,755,213 A | 5/1998 | Gardner, Jr. et al. | |
| 5,957,119 A | 9/1999 | Perry et al. | |
| 6,409,150 B2 * | 6/2002 | Sullivan et al. | 251/360 |
| 6,539,969 B1 | 4/2003 | Sullivan | |
| 6,637,450 B2 | 10/2003 | Huang | |
| 6,675,791 B1 | 1/2004 | Alexander et al. | |
| 2003/0094195 A1 | 5/2003 | Huang | |
| 2005/0253105 A1 * | 11/2005 | Gardner et al. | 251/144 |

FOREIGN PATENT DOCUMENTS

| | | |
|---|---|---|
| GB | 2372552 A | 8/2002 |
| WO | WO97/05535 | 2/1997 |
| WO | WO/9942912 | 8/1999 |

OTHER PUBLICATIONS

Article: "News from CPSC; U.S. Consumer Product Safety Commission"—Mar. 24, 2004.

* cited by examiner

*Primary Examiner*—Michael J. Carone
*Assistant Examiner*—Gabriel J Klein
(74) *Attorney, Agent, or Firm*—Volpe and Koenig PC

(57) ABSTRACT

A valve, possibly for use in a paintball marker, has a longer threaded portion that insures a canister that engages the valve must undergo many twists to become unscrewed from the valve. Alternatively, the valve has an elongated threaded portion with gas bleed channels that extend along a substantial portion of the threading. Still alternatively, the valve may use visual markings along the length of the threaded portion to indicate to a user that the canister is being unscrewed.

5 Claims, 12 Drawing Sheets

Standard CO2 Valve

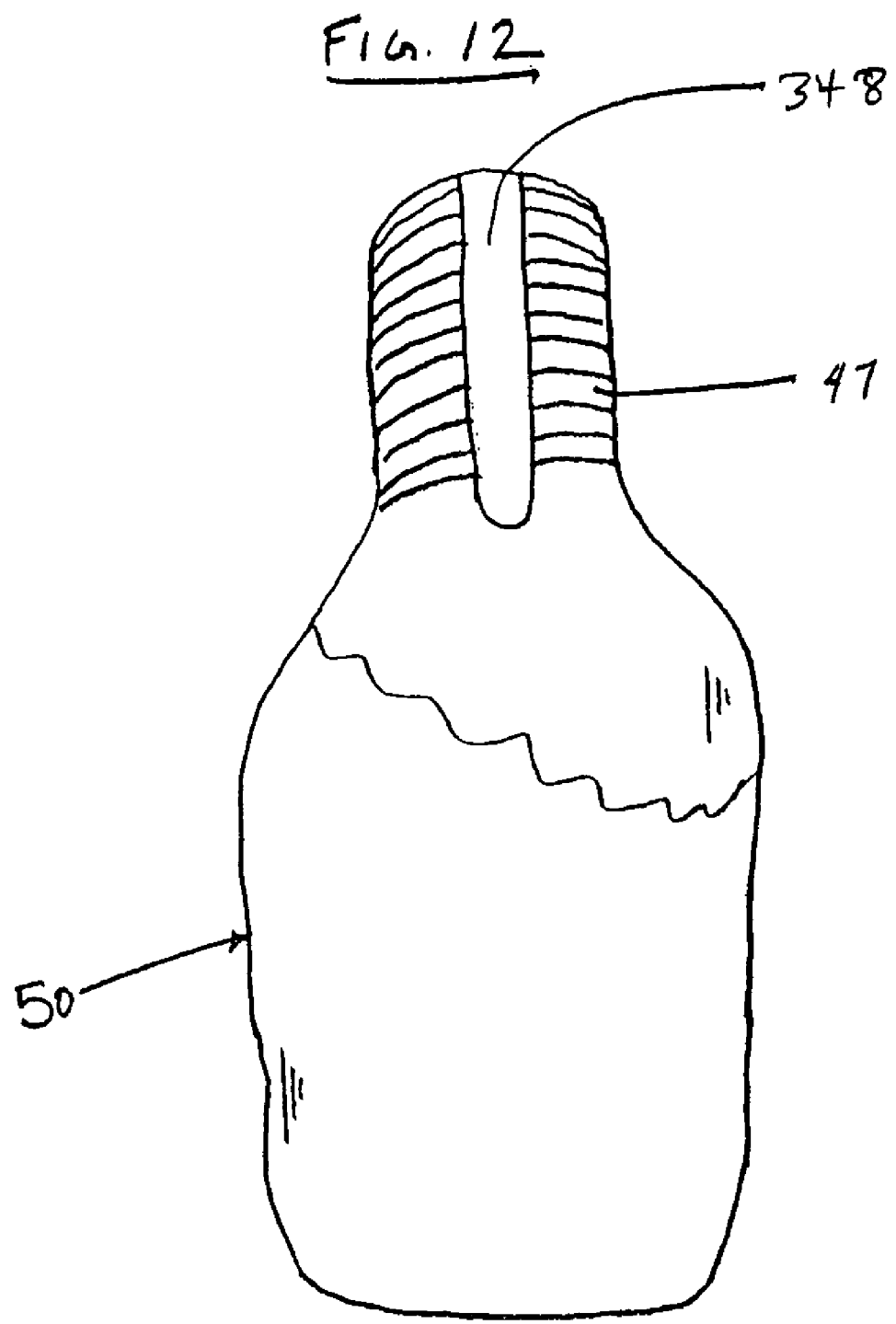

VALVE FOR AIR TANK

This application claims the benefit of U.S. Provisional Patent Application No. 60/604,762, filed Aug. 26, 2004, a Continuation of U.S. patent application Ser. No. 11/001,716 filed Dec. 2, 2004, now U.S. Pat. No. 7,163,008 and a Continuation of U.S. patent application Ser. No. 11/485,067 filed Jul. 12, 2006 now U.S. Pat. No. 7,231,912 which are incorporated by reference as if fully set forth.

BACKGROUND

In the sport of paintball, players use a paintball gun or "marker," to fire ammunition (paintballs) that bursts upon impact. To generate the force necessary to burst the paintballs on impact, paintball markers drive the paintballs using compressed gas, usually Carbon Dioxide ($CO_2$) or a Nitrogen/High Pressure Air (N2/HPA) mixture These gases are stored in compressed gas tanks, also referred to collectively as gas tanks, air tanks, air canisters, or canisters.

The tank comprises, generally, a canister, and a valve closing off an open end of the canister. One end of the valve is designed to securely screw into the canister, usually by threaded engagement. Another end of the valve is threaded for engagement with a portion of, for example, a paintball marker, or a paintball marker accessory that is designed to receive the tank.

FIG. 1 shows standard valve 10 used in threaded engagement with a canister (not shown), a burst disk assembly 15 that engages the valve through the hole 15*a* (shown in phantom), and a threaded portion 16 for engaging an air tank. Internally, the valve 10 comprises a depressor pin 20, a depressor pin spring 22, and a retainer plug 24. The threaded portion 16, may be provided with a vent hole 17 that releases pressure built up inside the valve to atmosphere.

There are drawbacks of these prior art canister and valve combinations, especially as the canister begins unscrewing from the valve. During intentional or unintentional unscrewing, pressure from the compressed gas inside the canister presses against the valve and can unexpectedly separate the canister and valve as the engaged threads between the canister and valve decrease. The only known safety mechanism for the valve and canister interface is directed at pressure relief from inside the valve and is shown in prior art FIG. 1.

SUMMARY OF THE INVENTION

The present invention seeks to overcome the pressure release problem as the canister is unscrewed from the valve. To solve this problem, the invention shows at least six embodiments. The first shows a valve with a longer threaded portion that insures the canister must undergo many twists to become unscrewed from the valve. The second is a valve with an elongated threaded portion having gas bleed channels that extend along a substantial portion of the threading. The third is a standard threaded portion valve with the gas bleed channels. The fourth is a series of channels that extend along the threaded portion for short spans (usable with the standard or elongated threaded portion). The fifth uses visual markings along the length of the threaded portion to indicate to a user that the canister is being unscrewed. The sixth uses a canister with gas bleed channels formed on a threaded portion thereof. Several other variant embodiments of these three major embodiments are discussed below.

BRIEF DESCRIPTION OF THE DRAWINGS

FIG. 12 shows an isometric view of a sixth embodiment of the present invention.

DETAILED DESCRIPTION OF THE PREFERRED EMBODIMENTS

Figure 1:
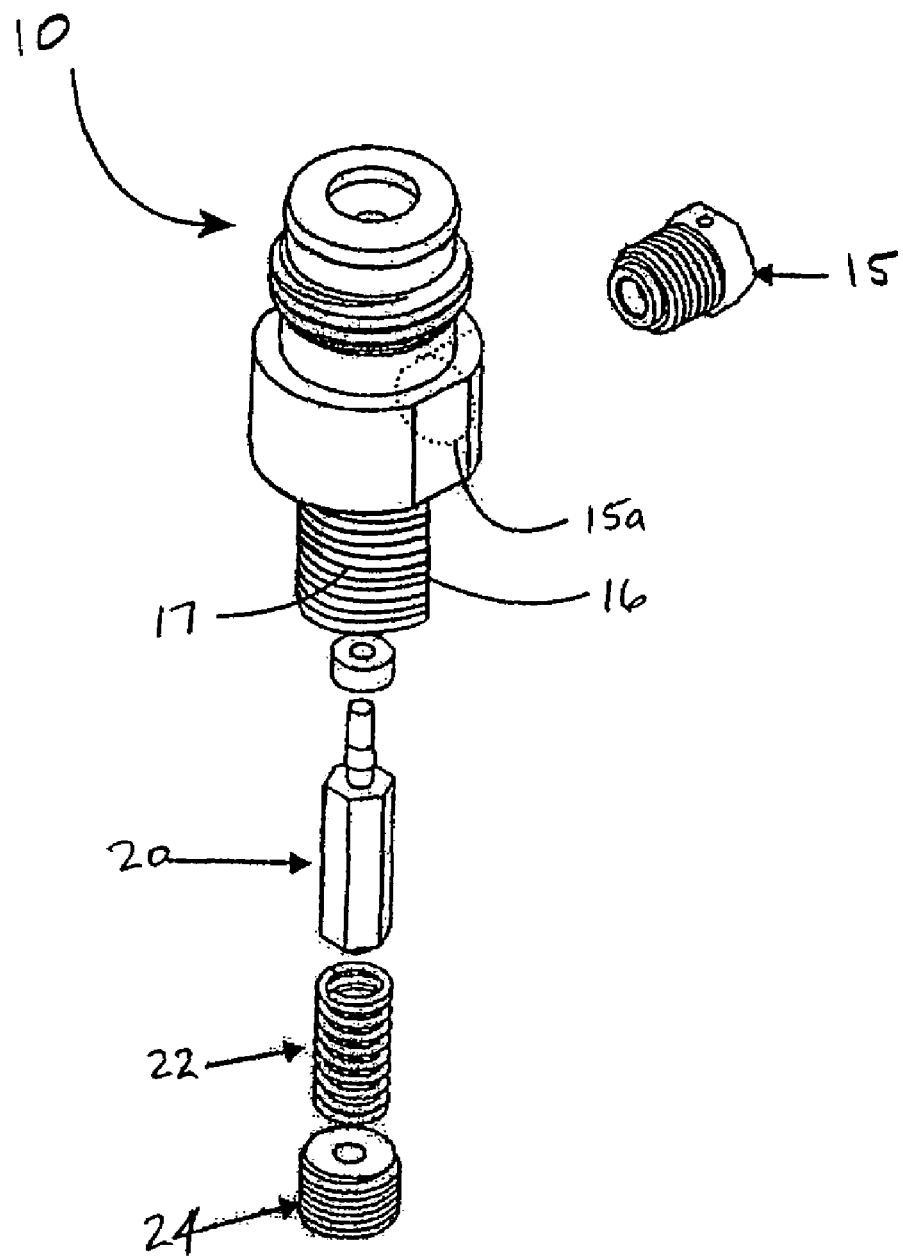
FIG. 1 is a perspective view of a standard CO2 valve of the prior art.
Figure 2:
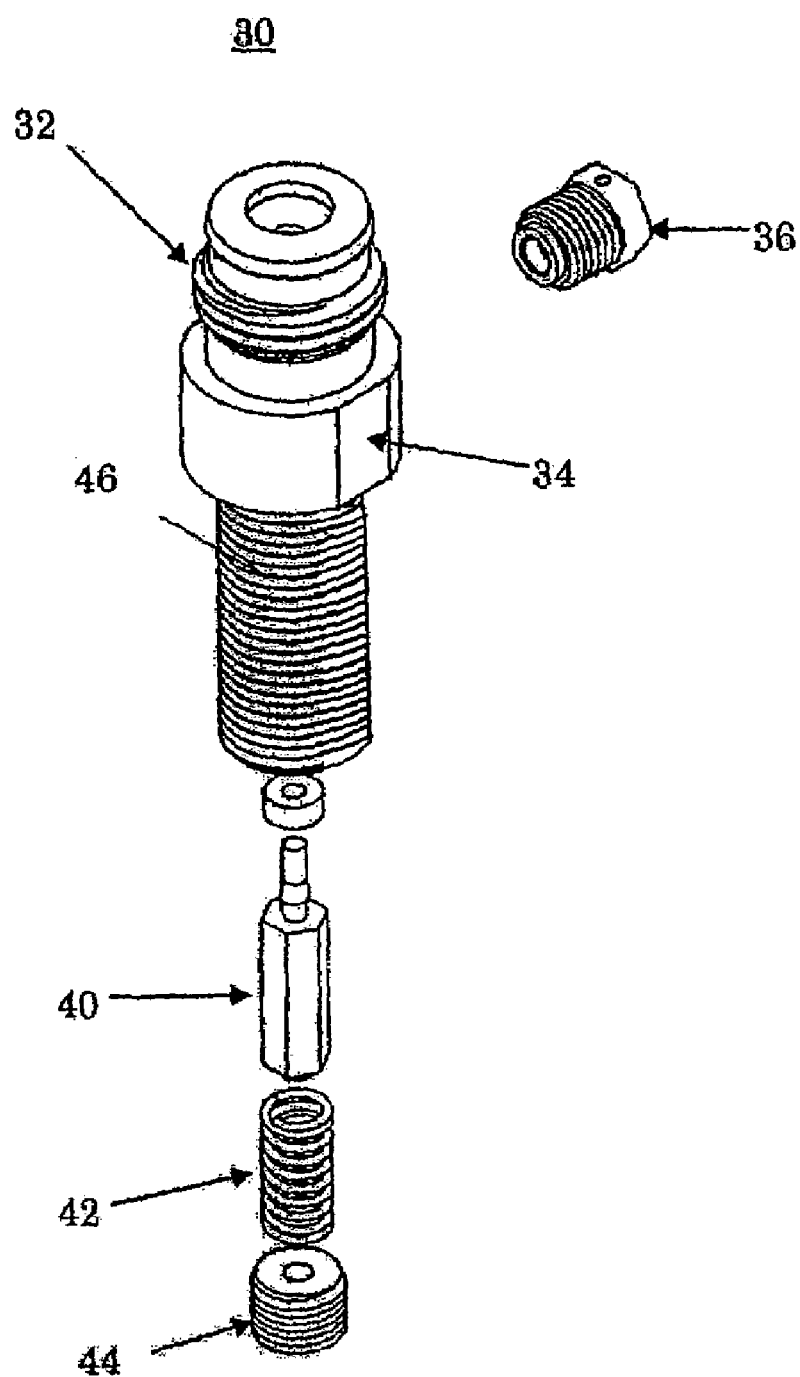
FIG. 2 is an exploded view of an elongated valve according to the present invention.
Figure 3:
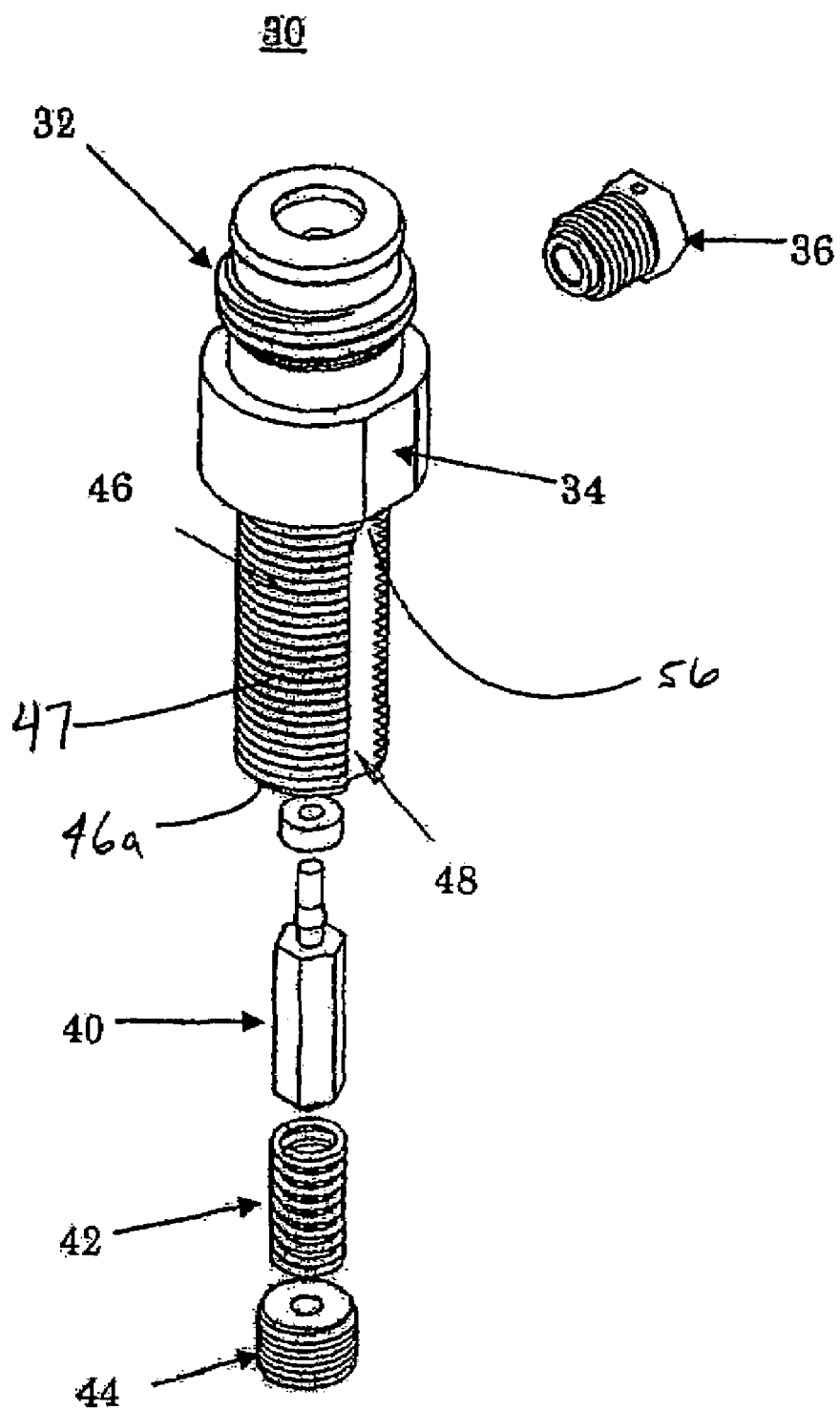
FIG. 3 is an exploded view of an elongated valve according to a second embodiment of the present invention.
Figure 4:
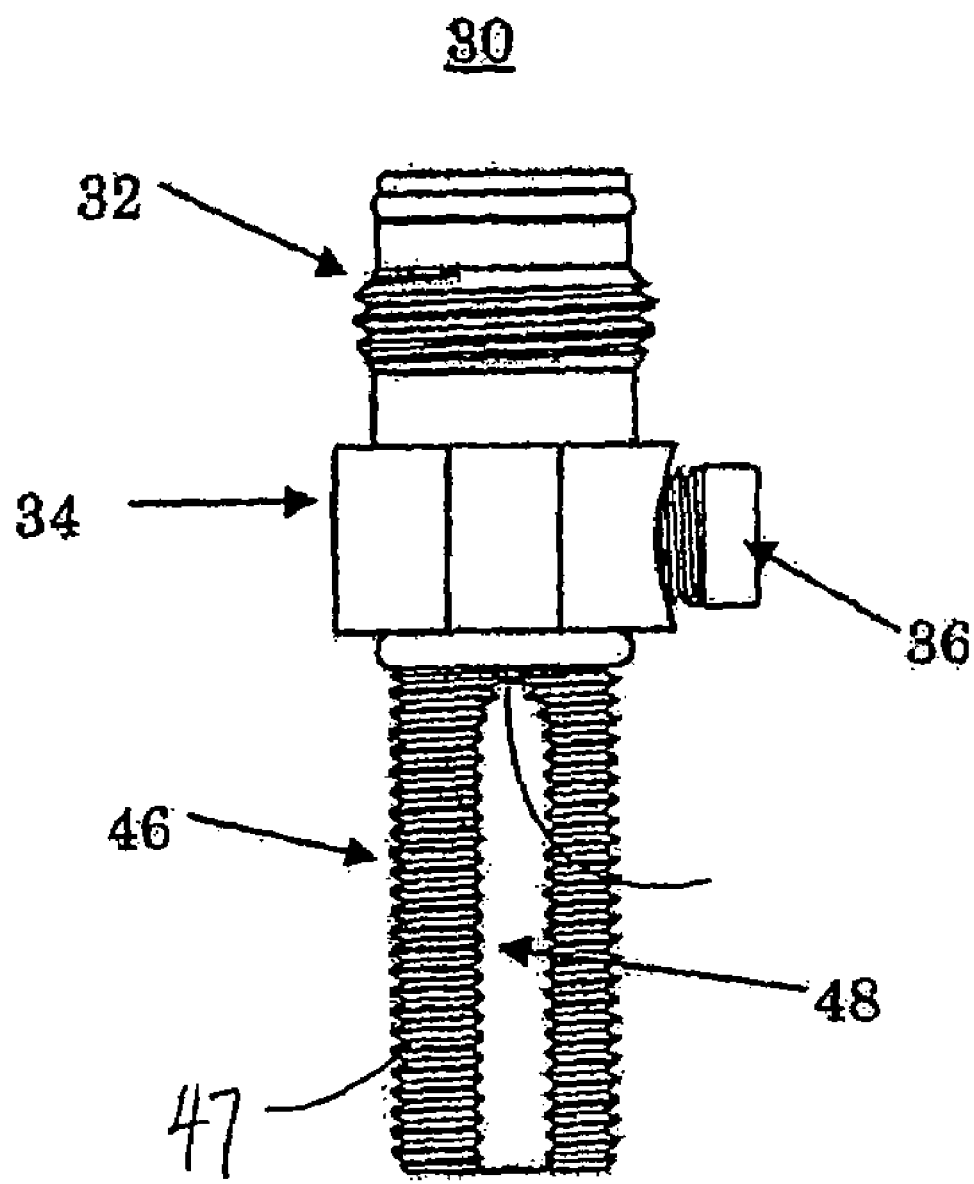
FIG. 4 is a side elevation view of an elongated valve according to the second embodiment of the present invention.
Figure 5:
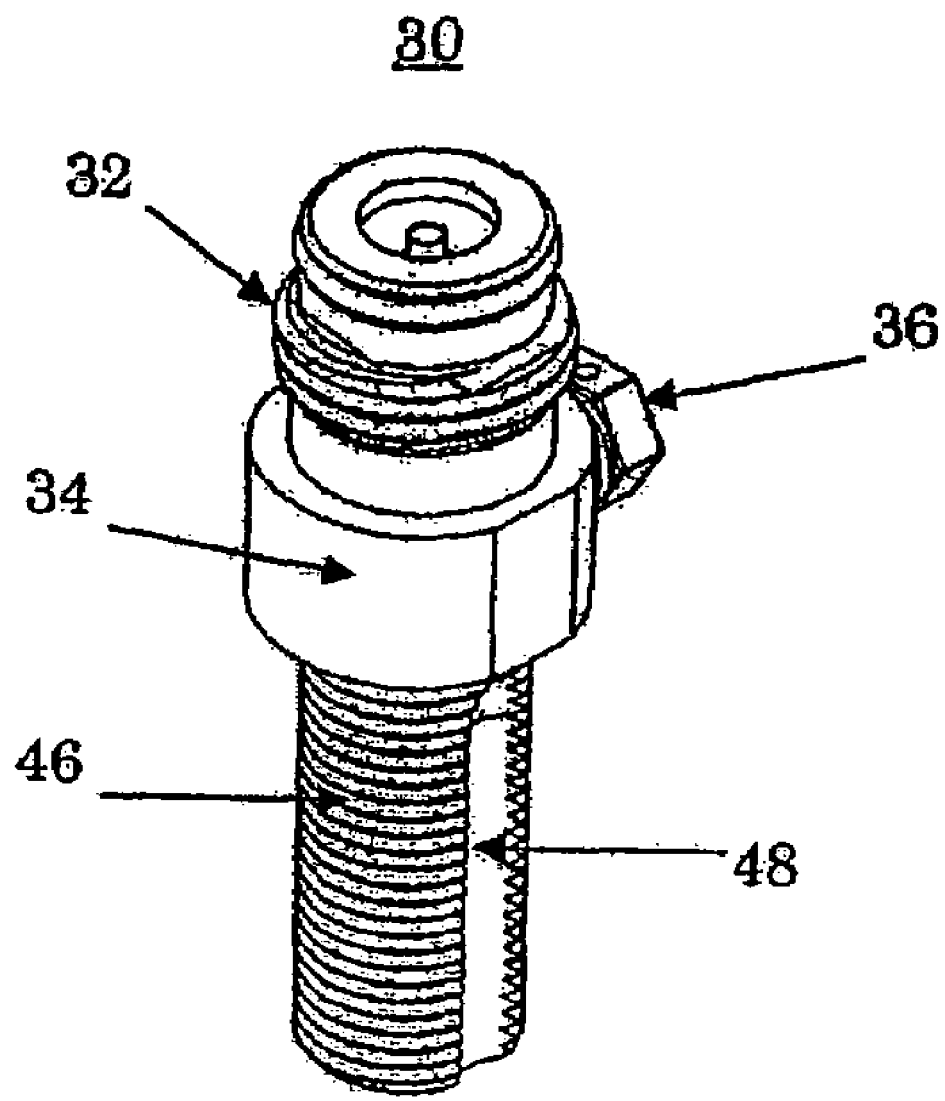
FIG. 5 is a perspective view of an elongated valve according to the second embodiment of the present invention.

As shown in FIGS. 2-11, a valve 30 generally comprises a threaded propellant interface portion 32, a valve body 34, a threaded portion 46, 146, 246, and an axial hole 45 therethrough that runs between the interface portion 32 and the threaded portion 46. A unified burst disk assembly 36 may also be provided, which screws into a threaded hole in the value 30. Internally, the valve 30 comprises a depressor pin 40, a depressor pin spring 42, and a retainer plug 44.

A valve 30 according to a first embodiment of the present invention further comprises an elongated threaded portion 46 comprising a plurality of threads for securely engaging an air tank canister. The standard size valve 10 threaded portion 46 is preferably around ¾ inches long, as opposed to the longer threaded portion 46 in FIGS. 2-7, which is preferably 1.5 inches long. The elongated male threaded portion 46 engages the female threaded canister 50 over a longer distance, which means that removing the canister 50 takes longer. This longer duration for unscrewing the canister 50 minimizes the chance of fully removing the canister by accident. Even after a significant number of revolutions (turns) of a canister 50 with respect to the valve 30, there will still be a number of engaged threads securing the valve 30 to the canister 50.

FIGS. 3-7 show a second embodiment of the invention used with the valve with the longer threaded portion. The valve 30 in FIGS. 3-7 has a gas bleed channel 48 that extend to a terminal end 46a of the threaded portion 46 that provides an audible signal when the valve begins to unscrew from the canister 50. This audible signal is from the compressed gas escaping from the canister 50 through the channel 48. Further, this gas release, if not corrected quickly (by tightening the canister to the valve), will drain the compressed gas from the canister, and minimize the chance of unscrewing the canister 50 under pressure.

Figure 6:
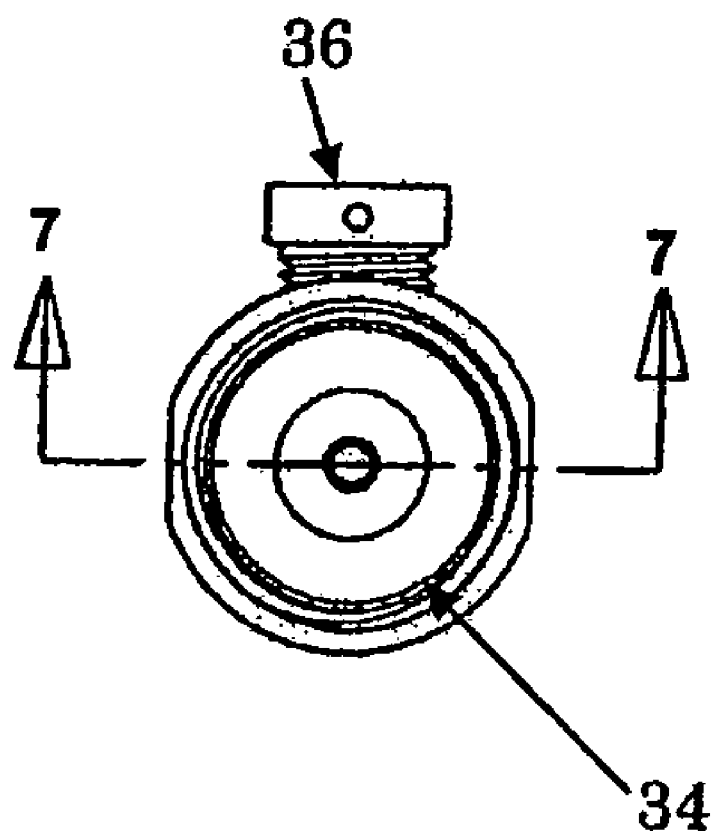
FIG. 6 is a top plan view of the elongated valve according to the second embodiment of the present invention.
Figure 7:
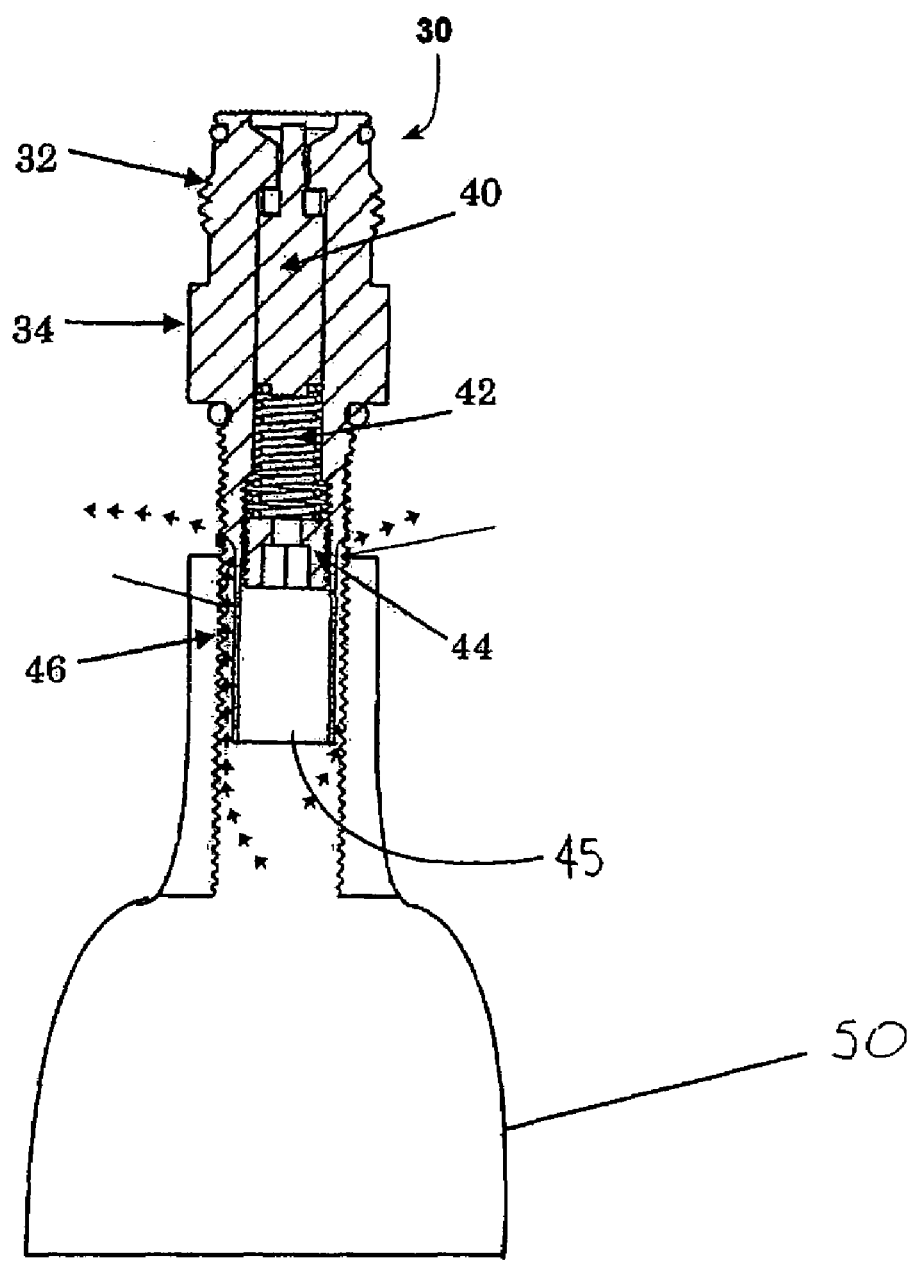
FIG. 7 is a sectional view of elongated valve according to the second embodiment of the present invention taken along line 7-7 in FIG. 6.

The valve 30 comprises at least one gas bleed channel 48 along at least a portion of the length of the threaded portion 46. The gas bleed channel 48 formed along a portion of the length of the elongated threaded portion 46, indented below the upper edge 56 of the threads 47. The gas bleed channel 48 may narrower adjacent the valve body 34, as shown. Preferably at least two gas bleed slots are formed on opposite sides of the threaded portion 46, as shown in FIGS. 6 and 7, although a plurality of gas bleed channel 48 may be provided. With multiple channels 48, an even number of gas bleed channels 48 are formed in pairs on opposite sides of the threaded portion 46. This opposed channel position allows compressed air to escape from the canister 25 evenly instead of only along one side of the threaded portion 46, which might cock the canister 50 or release a lot of compressed gas through a single small channel 48 and separate the canister 50 from the valve 30.

In use, should the valve 30 begin to separate from an air tank canister 50 the upper portion of the gas bleed channel 48 will initially be exposed. As shown in FIG. 7, the channel 48 provides an escape for compressed gas in the canister 50 to follow the path indicated by the arrows. Escaping compressed gas should be audible and provide a warning that the valve 30 has begun to separate from the canister 50. In the event that the marker user does not hear the escaping gas, the releasing gas will eventually depressurize the canister 50, and minimize the chance of the canister 50 dislodging from the valve 30 under pressure.

Figure 8:
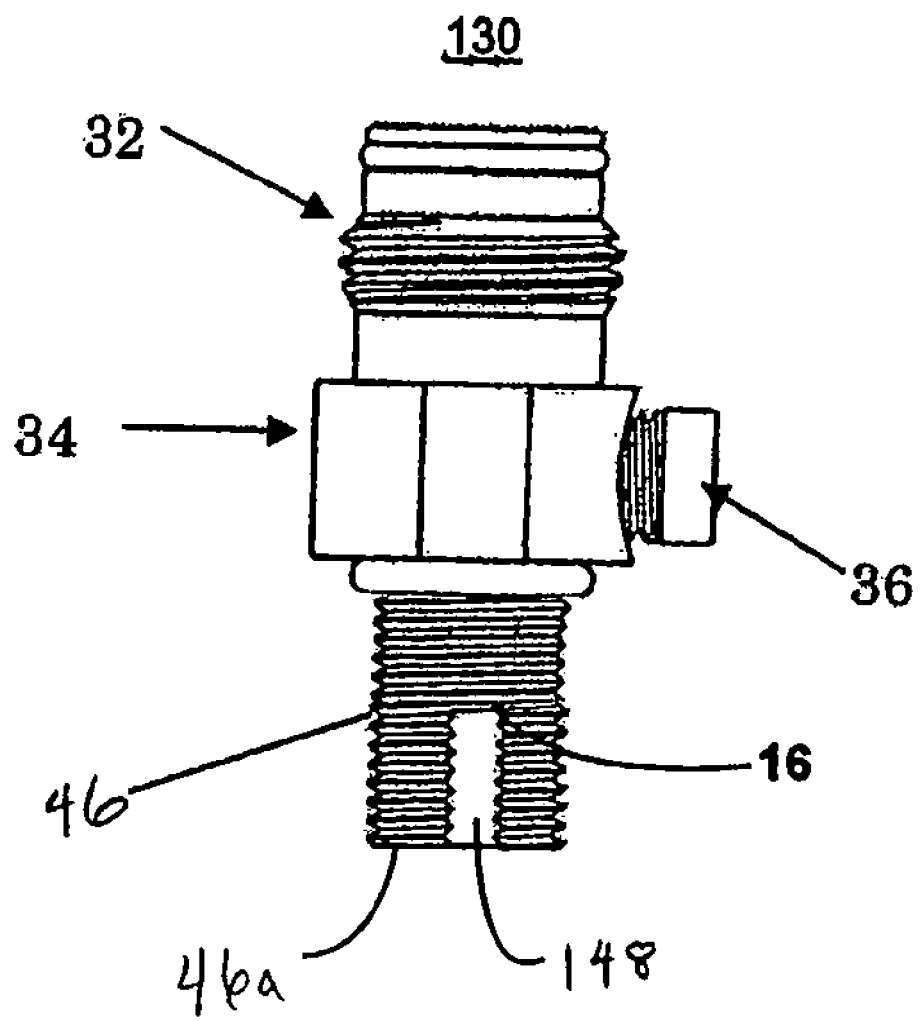
FIGS. 8 and 9 show side views of a third alternate embodiment of the present invention.
Figure 9:
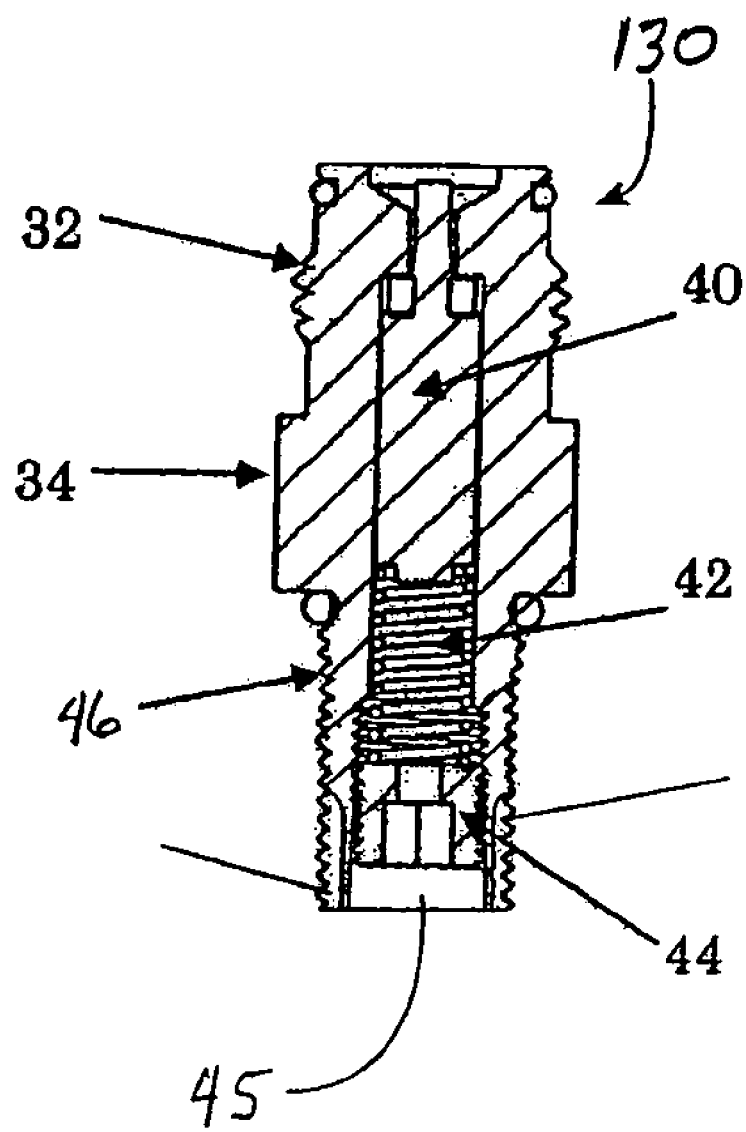

FIGS. 8 and 9 show a third embodiment using a standard size valve 130 with the bleed channel 148, as opposed to the valve 30 with the longer threaded portion 46 shown in FIGS. 2-7. The advantage of the standard size valve 130 used with the gas bleed channel 148 is that it fits within all standard size valve accessories, including packaging, canisters, and other products that depend on valve size.

Figure 10:
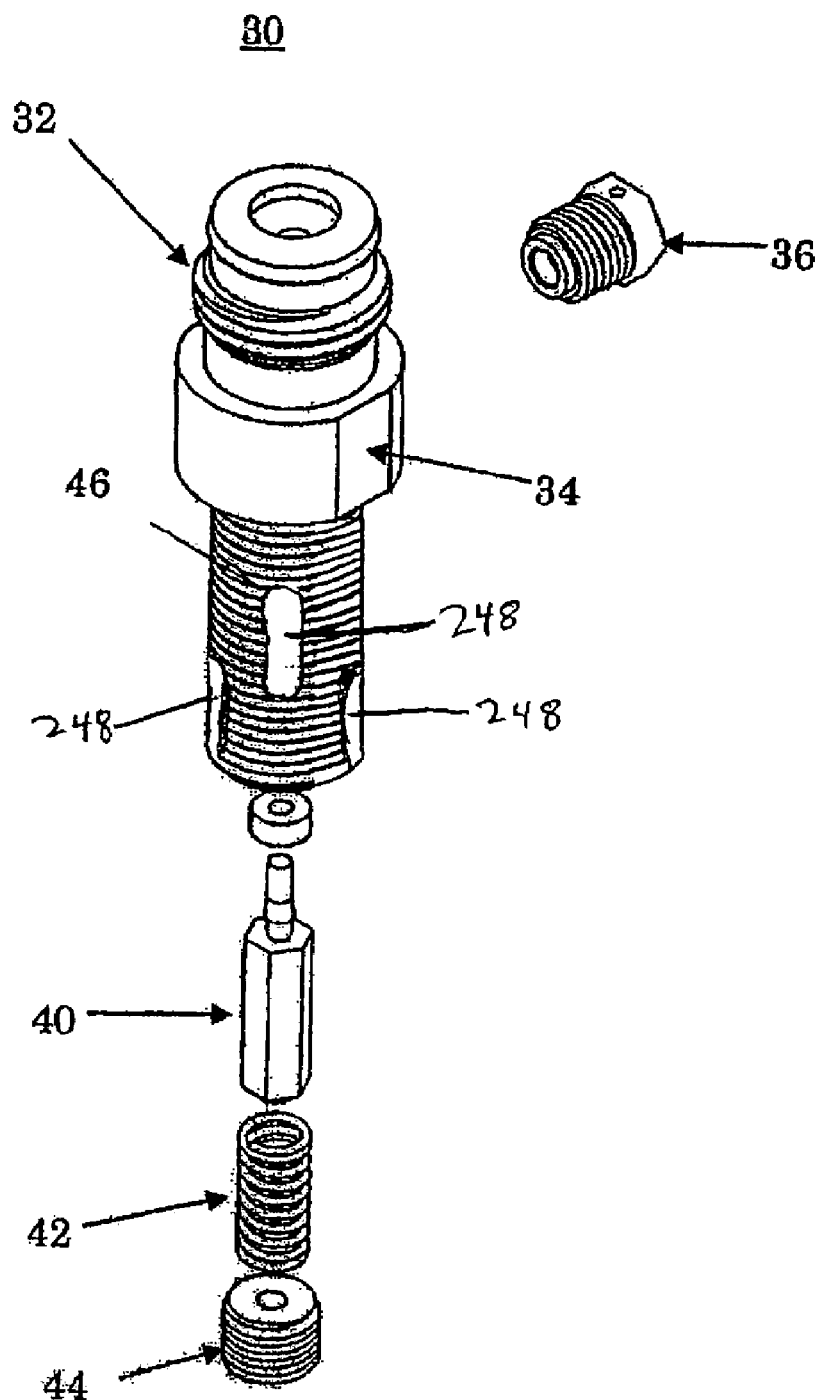
FIG. 10 shows an isometric view of a fourth alternate embodiment of the present invention.

FIG. 10 shows a fourth embodiment of the invention in which the valve has one or preferably several channels 248 located at different locations along the threaded portion 46. These channels 248 serve the same purpose as the slots 48, 148, in that they release air from the canister 50. The channels 248 are preferably located at different positions around the circumference and along the length (distance from the terminal end 149 of the threaded portion 146) of the threaded portion 46, 146, and optimally located so that pairs of the channels 248 are positioned on opposite sides of the threaded portion 146. The channels 248 are preferably located so that at least one pair of channels 248 allows air to pass through from the canister through a channel 248 to the atmosphere at each position of the canister 50 as it is unscrewed. The advantage of the channels 248 is that they interrupt the threaded portion 46, 146 less than the longer channels 48, 148. Further, multiple channels 248 will not likely all become blocked and rendered useless at once, whereas, if the channel 48, 148 becomes blocked, it is ineffective for releasing the compressed gas.

Figure 11:
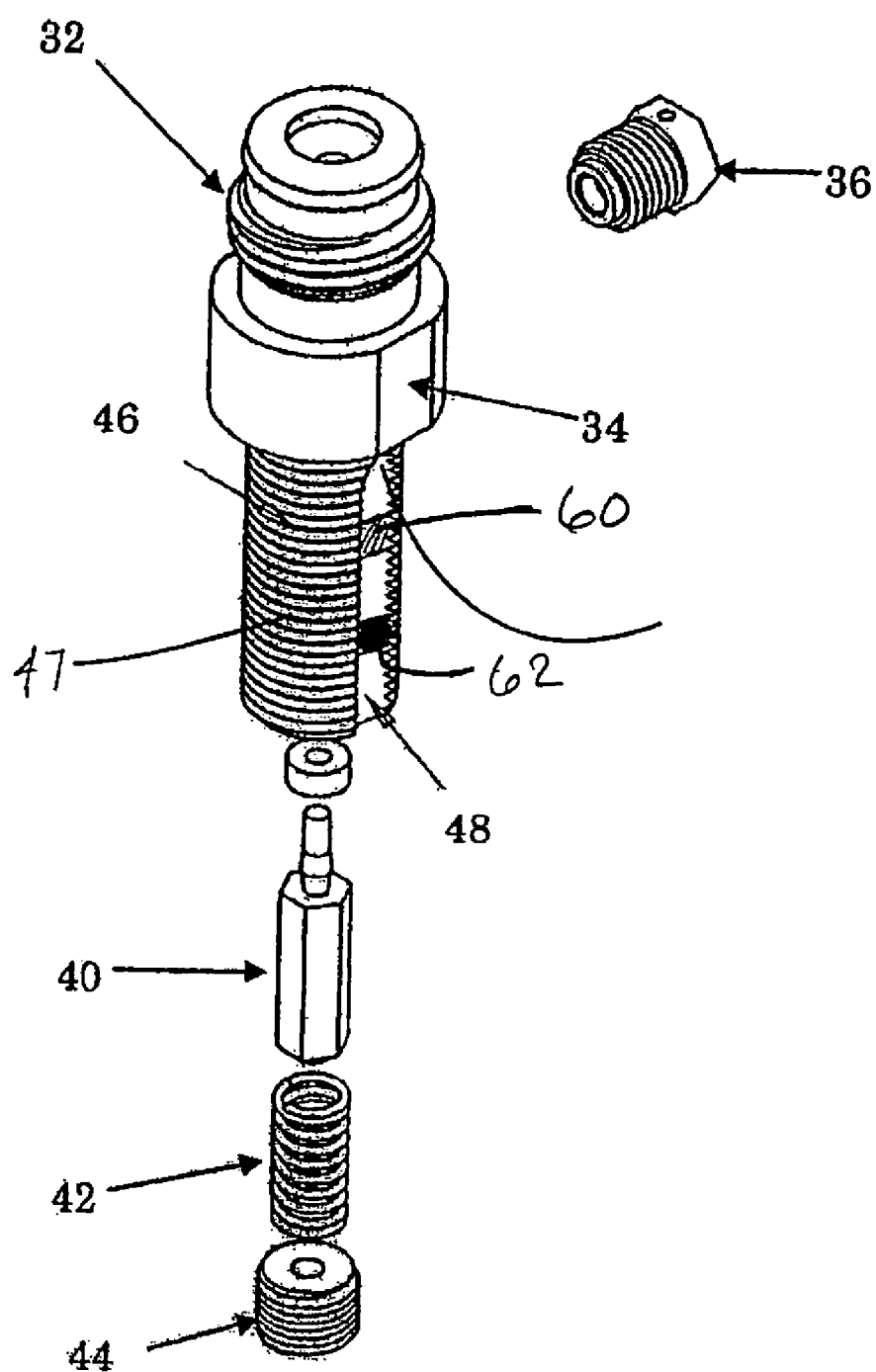
FIG. 11 shows an isometric view of a fifth alternate embodiment of the present invention.

In the fifth embodiment shown in FIG. 11, the elongated threaded portion 46 may be marked with a visible indicator 60. For example, the threaded portion 46 may be colored in contrast to the valve body and/or canister, such that once a user sees the color "red", by way of example, it is a visible indicator that the valve is coming away from the canister. In addition, should a color indicator be employed, the appearance of a contrasting color when the threads 18 become visible will provide a visual indicator as well. The use of different color bands 60, 62 along the threaded portion 46 could indicate the canister is becoming screwed, that is, when slightly unscrewed, the user sees yellow threads, further unscrewing shows orange threads, and the final threads engaging the canister 50 could be red. These indicators could all be color-coded to indicate the amount that the canister has been unscrewed, as discussed above. Further, although the channel 48 is shown as having the indicator 60 thereon, the indicator 60 could be marked on the threads 47 themselves, or on both the threads 47 and the channel 48.

The sixth embodiment shown in FIG. 11 shows a canister 50 with channels 348 formed therein. This canister 50 would engage a standard or elongated threaded portion of a valve, and give an audible signal and release gas during unscrewing of the canister.

The valve can be made of metal, plastic, ceramic or other suitable materials. Furthermore, the valve can be manufactured by casting, machining, injection molding, etc. The gas bleed slot can be formed during the casting or molding step as part of the mold. Alternatively, the gas bleed slot can be formed after casting by machining.

The present invention is not limited to particular canisters, and the valve described herein may be used with any canister, such as those used in connection with fire extinguishers, propellant gas tanks, and the like. It is understood that the present invention is not limited to the particular embodiments shown and described herein, but that various changes and modifications may be made without departing from the scope and spirit of the invention.

What is claimed is:

1. A valve for a paintball marker comprising:
   a propellant interface portion; and
   a threaded portion for threadedly engaging a canister of compressed gas and in communication with the propellant interface portion through an axial hole extending through the threaded portion and propellant interface
   wherein the threaded portion comprises at least one channel extending through threads in the threaded portion.

2. The valve of claim 1 wherein the threaded portion is between ¾ and 2.0 inches long.

3. The valve of claim 1 wherein the number of channels is an even number, and the paired channels are located parallel to an axis of the axial hole and equidistant from each other on opposed portions of a circumference defined by the threaded portion.

4. The valve of claim 3 wherein the channels extend for more than half the length of the threaded portion.

5. The valve of claim 3 wherein the number of channels is an even number of four or more, and each pair of opposed channels is located at a different distance from a terminal end of the threaded portion as another pair of channels.

* * * * *